United States Patent [19]

Yamamura et al.

[11] 4,330,301

[45] May 18, 1982

[54] DISPERSANT FOR AQUEOUS SLURRY OF COAL POWDER

[75] Inventors: Masaaki Yamamura; Noboru Moriyama; Shin-ichi Watanabe, all of Wakayama, Japan

[73] Assignee: Kao Soap Co., Ltd., Tokyo, Japan

[21] Appl. No.: 165,877

[22] Filed: Jul. 3, 1980

[30] Foreign Application Priority Data

Jul. 26, 1979 [JP] Japan .................................. 54-95173

[51] Int. Cl.³ .............................................. C10L 1/32
[52] U.S. Cl. ......................................................... 44/51
[58] Field of Search .............. 44/51; 252/311; 406/47, 406/49, 197

[56] References Cited

U.S. PATENT DOCUMENTS

| | | | |
|---|---|---|---|
| 2,056,924 | 10/1936 | Kalber | 252/313 R |
| 2,346,151 | 4/1944 | Burk et al. | 44/51 |
| 2,550,982 | 5/1951 | Eberz | 44/51 |
| 4,094,810 | 6/1978 | Thomas | 44/51 |
| 4,104,035 | 8/1978 | Cole et al. | 44/51 |

*Primary Examiner*—Winston A. Douglas
*Assistant Examiner*—Y. Harris-Smith
*Attorney, Agent, or Firm*—Blanchard, Flynn, Thiel, Boutell & Tanis

[57] ABSTRACT

A dispersant for forming an aqueous slurry of coal powder having a good flowability, which comprises as the active ingredient at least one member selected from sulfonation products of polycyclic aromatic compounds which may have a hydrocarbon group as a substituent, salts thereof and formaldehyde condensates thereof.

7 Claims, No Drawings

DISPERSANT FOR AQUEOUS SLURRY OF COAL POWDER

The present invention relates to a dispersant for an aqueous slurry of coal powder. More particularly, the present invention relates to a dispersant for dispersing coal powder in water and forming an aqueous slurry which can be transported by a pipe line transportation system.

The price of petroleum, which has been most widely used as an energy source, is rising and petroleum reserves are limited. Therefore, developing new energy sources and insuring stable supplies of these energy sources have become important. Accordingly, increased consideration is being given to the utilization of coal, which is present in large deposits in various places in the world without particularly uneven distribution. However, coal is solid and is different from petroleum, which is liquid, and its adaptability to handling and transportation. Mined coal cannot be transported by a pipe line and it is very disadvantageous in handling and transportation. Furthermore, coal has a higher ash content than petroleum and involves problems of reduction of the calorific value and treatment of fly ash. As means for solving the problem of the poor handling property, there have been proposed and examined methods in which coal is powdered, the powdered coal is dispersed in water and the powdered coal is used in the form of the thus prepared aqueous slurry. These methods, however, are still defective. For example, if the coal concentration is increased, the viscosity of the slurry is remarkably increased and the flowability is lost. If the coal concentration is reduced, the transportation efficiency is reduced and the dewatering operation becomes expensive. Accordingly, the methods cannot be adopted in industrial practice. More specifically, agglomeration of coal particles is caused in the aqueous slurry of coal, resulting in an increase of the viscosity and a reduction of the flowability of the slurry. When the size of the coal particles in the aqueous slurry is made smaller, the dispersion stability is improved, but the cost for effecting fine pulverization becomes large as the degree of fine pulverization is increased. Finely divided coal, which is now used in power stations, has such a particle size that 80% of the particles pass through a 200-mesh sieve, that is, about 74 microns. Accordingly, it is expected that this will be a standard for the particle size of coal powder for forming aqueous coal slurries. When a surface active agent is incorporated as a dispersant into an aqueous slurry of coal, the surface active agent is adsorbed on the interfaces between the water and the coal particles and the surface active agent exerts functions of crumbling coal particles and preventing agglomeration of coal particles, and it is expected that a good dispersion state will be produced. However, when common surface active agents, such as alkylbenzene sulfonate salts, are used, the flowability of the slurries is still insufficient and their practical utility is very low.

We have discovered an improved procedure for eliminating the defects of conventional aqueous slurries of coal.

More specifically, the present invention provides a dispersant for forming an aqueous slurry of coal powder having a good flowability, which comprises, as the active ingredient, at least one member selected from sulfonation products of polycyclic aromatic compounds which may have a hydrocarbon substituent, salts thereof and formaldehyde condensates thereof. Namely, petroleum sulfonic acid derivatives, lignin sulfonic and derivatives, naphthalene sulfonic acid derivatives, salts thereof and formaldehyde condensates thereof are used.

The compounds used in the present invention can be prepared by sulfonating naphthalene, alkyl-substituted naphthalene, anthracene, alkyl-substituted anthracene, lignin or petroleum residue having an aromatic ring, according to conventional procedures, subjecting the sulfonation product to a salt-forming reaction if necessary, and conducting condensation with formaldehyde, according to need. When the amount of the dispersant is smaller than 0.5% by weight, a formaldehyde condensate of a sulfonation product of naphthalene or a naphthalene derivative having an alkyl group or alkenyl group as the substituent, or a salt thereof, exerts a much higher effect than other polycyclic aromatic compounds, salts thereof and formaldehyde condensates thereof. In this case, it is preferred to use naphthalene or a substituted naphthalene containing an alkyl or alkenyl substituent having up to 6 carbon atoms on the average, and mixtures of such naphthalene compounds. For example, formaldehyde condensates of naphthalene sulfonic acid, butylnaphthalene sulfonic acid and mixtures thereof can be mentioned. In this case, it is preferred that the degree of condensation is 1.2 to 30, especially 1.2 to 10. If the degree of condensation is lower than 1.2, no substantial improvement of the effect can be attained by the condensation, and if the degree of condensation is higher than 30, the molecular weight is unduly increased and practical problems arise as regards the water solubility and the like.

Various polycyclic aromatic compounds can be used in the present invention. Lignin, naphthalene derivatives contained in petroleum residue such as alkylnaphthalene having an alkyl group having 1 to 6 carbon atoms are preferred, and good results can be obtained when these compounds are used. Of course, a mixture of alkyl-substituted derivatives can be used.

As the salts, there can be used salts of alkali metals such as sodium and potassium, salts of alkaline earth metals such as calcium, amine salts and ammonium salts.

A non-ionic surface active agent can be incorporated in such anionic surface active agent. In this case, however, the amount of the non-ionic surface active agent can be from 0 to 50 mole %, based on the anionic surface active agent used in the present invention.

If the dispersant of the present invention is incorporated in an amount of 0.01 to 5.0% by weight, preferably 0.05 to 2.0% by weight, based on the aqueous slurry, the coal particles can be effectively and stably dispersed in water. Ordinarily, when no dispersant is added, if the coal concentration of the slurry exceeds 30% by weight, the viscosity of the slurry is drastically increased, although this critical value of the coal concentration varies to some extent according to the kind and particle size of the coal powder that is used. If a dispersant is added in a predetermined amount, the coal particles are dispersed and the flowability is improved. If the coal concentration is too low in the aqueous slurry of coal, the transportation efficiency is reduced and the dewatering operation becomes expensive, and the commercial advantages of the formation of an aqueous slurry of coal are lost. However, if the coal concentration is too high, the viscosity is increased. The coal concentration is therefore adjusted to from 30 to 85% by weight, preferably 50 to 75% by weight, based on the weight of the slurry, although this range varies to some extent according to the kind and particle size of the coal that is used.

Each of the sulfonated dispersants is an anionic surface active agent, and it exerts a function of dispersing coal particles in water by imparting charges to the coal particles, while it is highly adsorbed in hydrophobic parts of the coal particles. The ash in the coal particles coalesces and is precipitated or floats in the coal slurry, and therefore, separation of the ash from the coal slurry becomes possible.

It is known that when solid fine particles are dispersed in a dispersion medium by addition of a dispersant, the amount deposited of the precipitates is decreased as the dispersibility is high. By addition of the dispersant of the present invention, there can be attained not only the effects of improving the transportation adaptability by reducing the viscosity of the slurry and separating ash from the slurry, but also, the effect of facilitating the dewatering operation by reducing the amount deposited of precipitated coal particles.

The order of mixing the coal, the dispersant and water is not particularly critical. There can be adopted a method in which the dispersant is dissolved or dispersed in water, coal is added to the solution or dispersion and an aqueous slurry is formed by an appropriate mixing device or pulverizing device.

The coal referred to in the present invention includes anthracite, bituminous coal, sub-bituminous coal and brown coal.

A method for separating and recovering coal from an aqueous slurry of coal, after completion of transportation, which comprises adding a hydrocarbon oil not compatible with water as a dispersion medium to granulate coal powder and separating and recovering coal granules has recently attracted attention in the art (see, for example, Japanese patent application laid-open specification No. 37901/77). For attaining the above object, a hydrocarbon oil is often added when an aqueous slurry of coal is prepared. The dispersing agent of the present invention does not lose its dispersing effect, but rather retains its excellent properties, even if the dispersant is applied to a system wherein such hydrocarbon oil is co-present.

The present invention will now be further described in detail with reference to the following illustrative Examples that by no means limit the scope of the invention.

EXAMPLE 1

(1) Preparation of Aqueous Slurry and Evaluation of Flowability

In 199.5 g of water, there was dispersed 0.5 g of a sodium butylnaphthalene-sulfonate/formaldehyde condensate (condensation degree=4), and then 300 g of Vermont coal (described hereinafter) pulverized so that 80% of the particles passed through a 200-mesh sieve, was added little by little to the dispersion at room temperature. After completion of the dropwise addition, the mixture was agitated at 5000 rpm for 5 minutes by a homogenizing mixer (manufactured by Tokushu Kikako) to form an aqueous slurry of coal. The mixture was found to have a viscosity of 2500 cP as measured at 25° C. The flowability of the slurry was good. Test results of other samples, which were obtained in the same manner, are shown in Table 1. A lower viscosity indicates a better flowability.

(2) Evaluation of Ease of Removal of Ash

A stainless steel cylinder having an inner diameter of 5.5 cm and a height of 24 cm was used as a test device. Plugged withdrawal openings were provided at positions 6 cm, 12 cm and 18 cm from the bottom. A predetermined amount of the aqueous coal slurry prepared as described above was charged in the cylinder to a height of 18 cm from the bottom and was allowed to stand still for 3 days. After passage of 3 days, the plug was removed at the position 12 cm from the bottom, and the slurry present above this plug (the coal slurry present in the zone from the position of the height of 12 cm to the position of the height of 18 cm) was taken out as the upper layer sample. Then, the ash content in the coal of the sample was determined. Then, the plug was removed at the position 6 cm from the bottom and the aqueous slurry present above this plug was taken out as the intermediate layer sample and the ash content in the coal of this sample was determined. Finally, the remaining aqueous slurry of coal was taken out as the lower layer sample, and the ash content in the coal of this sample was determined. It was found that the ash contents in the upper, intermediate and lower layer samples were 6.3% by weight, 10.2% by weight and 19.8% by weight, respectively. The test results obtained with other aqueous slurries are shown in Table 1.

A larger difference of the ash content in the coal among the respective layers indicates a better ash-removing property.

Vermont coal

Coal produced in Australia, characterized by a high grade calorific value of 6550 Kcal/Kg (JIS M-8814), an ash content of 15.95% (JIS M-8812), a fixed carbon content of 49.35% (JIS M-8812) and the following elementary analysis values (JIS M-8813):

C=69.20%, H=4.71%, N=1.23%, O=8.44%, S=0.50%, Cl=0.03%, Na=0.04%

TABLE 1

| Sample No. | Dispersant | Amount of Dispersant (1) | Coal Concentration (%) | Flowability Viscosity (cP) (2) | Flowability Evaluation (3) | Ash Removing Property upper layer | Ash Removing Property intermediate layer | Ash Removing Property lower layer | evaluation (3) |
|---|---|---|---|---|---|---|---|---|---|
| Comparative Samples | | | | | | | | | |
| 1 | not added | 0 | 60 | >20,000 | X | 15.4 | 16.0 | 16.1 | X |
| 2 | sodium dodecyl benzene sulfonate | 2.0 | 60 | 16,000 | X | 13.8 | 16.2 | 16.8 | X |
| 3 | sodium dodecyl benzene sulfonate | 1.0 | 60 | >20,000 | X | 15.3 | 15.9 | 16.2 | X |
| 4 | sodium oleate | 2.0 | 60 | >20,000 | X | 15.0 | 15.8 | 16.6 | X |
| 5 | sodium oleyl alcohol sulfate | 2.0 | 60 | >20,000 | X | 15.3 | 15.8 | 16.3 | X |
| 6 | sodium oleyl | 1.0 | 60 | >20,000 | X | 15.6 | 15.7 | 16.4 | X |

TABLE 1-continued

| Sample No. | Dispersant | Amount of Dispersant (1) | Coal Concentration (%) | Flowability Viscosity (cP) (2) | Evaluation (3) | Ash Removing Property upper layer | intermediate layer | lower layer | evaluation (3) |
|---|---|---|---|---|---|---|---|---|---|
| | alcohol sulfate | | | | | | | | |
| 7 | POE(10 moles)nonylphenyl ether | 2.0 | 60 | >20,000 | X | 15.2 | 16.1 | 16.6 | X |
| 8 | POE(10 moles)nonylphenyl ether | 1.0 | 60 | >20,000 | X | 15.6 | 16.0 | 16.1 | X |
| 9 | sodium dodecylbenzene sulfonate | 2.0 | 40 | 6,800 | Δ | 15.3 | 16.0 | 16.4 | X |
| Samples of Present Invention | | | | | | | | | |
| 1-1 | sodium butylnaphthalene sulfonate | 1.0 | 60 | 1,200 | O | 3.4 | 7.2 | 22.2 | O |
| 1-2 | sodium butylnaphthalene sulfonate | 0.5 | 60 | 4,900 | Δ | 10.9 | 12.8 | 17.8 | Δ |
| 1-3 | sodium butylnaphthalene sulfonate | 0.2 | 60 | 9,800 | Δ | 12.1 | 13.0 | 16.2 | Δ |
| 1-4 | sodium butylnaphthalene sulfonate | 0.1 | 60 | >20,000 | X | 14.7 | 15.0 | 15.7 | X |
| 2-1 | calcium butylnaphthalene sulfonate | 1.0 | 60 | 1,100 | O | 2.9 | 7.0 | 21.8 | O |
| 2-2 | calcium butylnaphthalene sulfonate | 0.1 | 60 | >20,000 | X | 13.7 | 14.9 | 16.6 | X |
| 3-1 | sodium hexylnaphthalene sulfonate | 1.0 | 60 | 1,200 | O | 2.8 | 6.3 | 23.0 | O |
| 3-2 | sodium hexylnaphthalene sulfonate | 0.1 | 60 | >20,000 | X | 14.4 | 15.1 | 16.6 | X |
| 4-1 | sodium petroleum sulfonate (4) | 1.0 | 60 | 1,600 | O | 7.4 | 10.1 | 18.3 | O |
| 4-2 | sodium petroleum sulfonate (4) | 0.5 | 60 | 5,700 | Δ | 12.1 | 14.3 | 17.0 | Δ |
| 4-3 | sodium petroleum sulfonate (4) | 0.2 | 60 | >20,000 | X | 15.6 | 15.8 | 16.3 | X |
| 4-4 | sodium petroleum sulfonate (4) | 0.1 | 60 | >20,000 | X | 15.7 | 15.8 | 16.2 | X |
| 5-1 | naphthalene-sulfonic acid/formaldehyde condensate (condensation degree of 4) | 1.0 | 60 | 1,400 | O | 3.5 | 6.3 | 22.1 | O |
| 5-2 | naphthalene-sulfonic acid/formaldehyde condensate (condensation degree of 4) | 0.5 | 60 | 1,700 | O | 4.7 | 7.1 | 21.6 | O |
| 5-3 | naphthalene-sulfonic acid/formaldehyde condensate (condensation degree of 4) | 0.2 | 60 | 1,800 | O | 4.8 | 7.5 | 20.9 | O |
| 5-4 | naphthalene-sulfonic acid/formaldehyde condensate (condensation degree of 4) | 0.1 | 60 | 2,100 | O | 4.9 | 7.9 | 20.0 | O |
| 5-5 | naphthalene-sulfonic acid/formaldehyde condensate (condensation degree of 4) | 0.05 | 60 | 2,400 | O | 5.2 | 8.1 | 19.6 | O |
| 6-1 | sodium salt of above condensate | 1.0 | 60 | 1,300 | O | 2.9 | 4.9 | 23.7 | O |
| 6-2 | sodium salt of above condensate | 0.5 | 60 | 1,800 | O | 4.1 | 6.2 | 22.5 | O |
| 6-3 | sodium salt of above condensate | 0.2 | 60 | 2,100 | O | 4.1 | 6.3 | 22.4 | O |
| 6-4 | sodium salt of above condensate | 0.1 | 60 | 2,200 | O | 4.9 | 8.0 | 21.7 | O |
| 6-5 | sodium salt of above condensate | 0.05 | 60 | 2,500 | O | 4.9 | 8.2 | 20.8 | O |
| 7-1 | sodium butylnaphthalene sulfonate/formaldehyde condensate (condensation degree of 4) | 1.0 | 60 | 1,300 | O | 2.6 | 5.1 | 23.0 | O |
| 7-2 | sodium butylnaphthalene sulfonate/formaldehyde condensate (condensation degree of 4) | 0.5 | 60 | 1,700 | O | 4.5 | 7.7 | 21.7 | O |
| 7-3 | sodium butylnaphthalene sulfonate/formaldehyde conden- | 0.2 | 60 | 2,400 | O | 6.3 | 10.3 | 20.0 | O |

TABLE 1-continued

| Sample No. | Dispersant | Amount of Dispersant (1) | Coal Concentration (%) | Flowability Viscosity (cP) (2) | Evaluation (3) | Ash Removing Property upper layer | intermediate layer | lower layer | evaluation (3) |
|---|---|---|---|---|---|---|---|---|---|
| | sate (condensation degree of 4) | | | | | | | | |
| 7-4 | sodium butylnaphthalene sulfonate/formaldehyde condensate (condensation degree of 4) | 0.1 | 60 | 2,500 | ○ | 6.3 | 10.2 | 19.8 | ○ |
| 7-5 | sodium butylnaphthalene sulfonate/formaldehyde condensate (condensation degree of 4) | 0.05 | 60 | 2,700 | ○ | 6.6 | 11.0 | 19.4 | ○ |
| 8-1 | same condensate (condensation degree of 8) | 1.0 | 60 | 1,300 | ○ | 2.8 | 6.1 | 22.3 | ○ |
| 8-2 | same condensate (condensation degree of 8) | 0.5 | 60 | 1,500 | ○ | 3.9 | 9.3 | 20.2 | ○ |
| 8-3 | same condensate (condensation degree of 8) | 0.2 | 60 | 1,600 | ○ | 3.9 | 10.0 | 20.0 | ○ |
| 8-4 | same condensate (condensation degree of 8) | 0.1 | 60 | 1,800 | ○ | 4.1 | 11.3 | 18.9 | ○ |
| 8-5 | same condensate (condensation degree of 8) | 0.05 | 60 | 2,000 | ○ | 4.3 | 11.9 | 18.0 | ○ |
| 9-1 | petroleum-sulfonic acid/formaldehyde condensate (condensation degree of 2) | 1.0 | 60 | 2,100 | ○ | 7.9 | 10.6 | 19.0 | ○ |
| 9-2 | petroleum-sulfonic acid/formaldehyde condensate (condensation degree of 2) | 0.5 | 60 | 2,300 | ○ | 10.1 | 12.4 | 17.1 | △ |
| 9-3 | petroleum-sulfonic acid/formaldehyde condensate (condensation degree of 2) | 0.2 | 60 | >20,000 | X | 14.1 | 15.0 | 16.9 | x |
| 9-4 | petroleum-sulfonic acid/formaldehyde condensate (condensation degree of 2) | 0.1 | 60 | >20,000 | X | 15.0 | 15.3 | 16.2 | x |
| 10-1 | sodium lignin sulfonate | 1.0 | 60 | 1,100 | ○ | 3.0 | 5.0 | 22.4 | ○ |
| 10-2 | sodium lignin sulfonate | 1.0 | 60 | 1,700 | ○ | 5.1 | 7.1 | 21.1 | ○ |
| 10-3 | sodium lignin sulfonate | 0.2 | 60 | 10,300 | △ | 12.4 | 15.0 | 16.7 | X |
| 10-4 | sodium lignin sulfonate | 0.1 | 60 | >20,000 | X | 13.6 | 14.7 | 16.4 | X |
| 11-1 | sodium butylnaphthalene sulfonate/formaldehyde condensate (condensation degree of 4) | 1.0 | 40 | 780 | ○ | 2.5 | 4.9 | 22.7 | ○ |
| 11-2 | sodium butylnaphthalene sulfonate/formaldehyde condensate (condensation degree of 4) | 0.5 | 40 | 840 | ○ | 4.1 | 7.2 | 21.6 | ○ |
| 11-3 | sodium butylnaphthalene sulfonate/formaldehyde condensate (condensation degree of 4) | 0.2 | 40 | 880 | ○ | 4.2 | 7.7 | 21.3 | ○ |
| 11-4 | sodium butylnaphthalene sulfonate/formaldehyde condensate (condensation degree of 4) | 0.1 | 40 | 910 | ○ | 4.4 | 7.5 | 21.4 | ○ |
| 11-5 | sodium butylnaphthalene sulfonate/formaldehyde condensate (condensation degree | 0.05 | 40 | 920 | ○ | 4.3 | 7.7 | 20.9 | ○ |

TABLE 1-continued

| Sample No. | Dispersant | Amount of Dispersant (1) | Coal Concentration (%) | Flowability Viscosity (cP) (2) | Flowability Evaluation (3) | Ash Removing Property upper layer | Ash Removing Property intermediate layer | Ash Removing Property lower layer | evaluation (3) |
|---|---|---|---|---|---|---|---|---|---|
| | of 4) | | | | | | | | |

Note
(1) % by weight based on the total slurry
(2) viscosity as measured at 25° C.
(3) :good, :relatively good, X:bad
(4) average molecular weight of 450
(5) a part of the ash was dispersed or floated in water and was thus lost The embodiments of the invention in which an exclusive property or privilege is claimed are defined as follows:

1. An aqueous slurry consisting essentially of from 30 to 85% by weight of powdered coal, from 0.01 to 5.0% by weight of dispersant for dispersing said powdered coal in water, said dispersant being a formaldehyde condensate of sulfonated naphthalene material selected from the group consisting of naphthalene sulfonic acid, alkylnaphthalene sulfonic acid, alkenylnaphthalene sulfonic acid, salts of said acids and mixtures thereof, and the balance is essentially water.

2. An aqueous slurry as claimed in claim 1 consisting essentially of
   from 50 to 75% by weight of powdered coal,
   from 0.05 to 2.0% by weight of said dispersant, and
   the balance is essentially water.

3. An aqueous slurry as claimed in claim 1 in which said alkylnaphthalene sulfonic acid has up to 6 carbon atoms in the alkyl substituent and said alkenylnaphthalene sulfonic acid has up to 6 carbon atoms in the alkenyl substituent.

4. An aqueous slurry as claimed in claim 1 in which the degree of condensation of said condensate is from 1.2 to 30.

5. An aqueous slurry as claimed in claim 1 in which the degree of condensation of said condensate is from 1.2 to 10.

6. An aqueous slurry as claimed in claim 5 in which said dispersant is a formaldehyde condensate of alkylnaphthalene sulfonic acid or salt thereof in which the alkyl group contains from 1 to 6 carbon atoms.

7. An aqueous slurry as claimed in claim 1 in which said salts of said acids are selected from the group consisting of sodium salts, potassium salts, calcium salts, amine salts and ammonium salts of said acids.

* * * * *